Aug. 30, 1966  J. DAHL  3,269,292
FINE FOCUSING DEVICE
Filed May 8, 1961  2 Sheets-Sheet 1

INVENTOR
JOSEPH DAHL
BY
*Walter Becker*

Aug. 30, 1966 J. DAHL 3,269,292

FINE FOCUSING DEVICE

Filed May 8, 1961 2 Sheets-Sheet 2

INVENTOR
JOSEPH DAHL

BY Walter Becker

United States Patent Office 3,269,292
Patented August 30, 1966

3,269,292
FINE FOCUSING DEVICE
Joseph Dahl, Rugener Strasse 6, Berlin N 65, Germany
Filed May 8, 1961, Ser. No. 110,607
1 Claim. (Cl. 95—44)

The present invention concerns fine focusing devices with two parallel planes of comparison one behind the other of a uniform plane carrier plate.

It is an object of this invention as applied to heretofore known multi-focusing devices as disclosed for instance in U.S. Patents 2,350,151 and 2,286,471 to make possible and assure a precise fine focus adjustment which will bring about an absolute correspondence of the image observed and the picture reflected on the carrier of the light sensitive layer.

In this way a considerable improvement of the sharpness of the smallest point determining the quality of the picture may be obtained to one thousandth of a millimeter ($1\mu$).

In order to obtain this fine precise focus determination and fixation of the focus, according to the present invention the focal plane is, as corrected for the thickness and index of refraction of the disc displaced from a central location between the planes of comparison, and means, preferably in the form of supporting surfaces, are provided on the focussing devices for locating the focal plane accurately in the apparatus. Such location is dependent on the thickness and the index of refraction of the glass of the focussing device which carries the planes of comparison. Multi-focus sharp adjusting focussing devices of this type may be employed for instance in cameras of various types, particularly in cameras with mirror reflection. By means of such multi-focus sharp adjusting devices, focal planes may be ascertained with precise focus location and coincidence and may be coordinated with other planes, which fact is of great importance with multi-color cameras.

Thus, for instance with an ordinary photographic camera, the focal plane has to be coordinated with the plane of the light sensitive layer, whereas with a mirror reflex camera, an image deviated by the mirror and serving for focusing the picture is to be coordinated with the plane of the carrier for the light sensitive layer. With multi-color cameras, all picture planes of the individual colors have to be mutually coordinated.

The advantage of the invention over heretofore known devices of the art involved consists in that it is possible to abandon the heretofore prevailing assumption that with a successful sharp focusing, an object would be sharp over a certain distance as indicated by a table showing the field of depth.

The plane of reference which is to be created and which coincides with the focal plane is therefore located outside the center of the two parallel serially arranged planes of reference of such picture sharp focusing device, and more specifically is located outside said center by a certain definite distance. The displacement of the plane of reference to be created outside the center of the multi focus picture sharp focusing device is to be ascertained optometrically and will cause no difficulties since numerous devices to this end are well known.

The device for fixing and substantiating the focal plane with a sharp focusing device with two parallel planes of reference arranged one behind the other, which are viewed simultaneously, is characterized according to the present invention in that when the images viewed on the reference planes or matte surfaces are equally sharp, the true focal plane of the lens will be the picture reproducing plane of the apparatus.

The method according to the present invention may also be employed in connection with picture focusing devices in which the parallel planes of reference which are located one behind the other are employed as cutouts.

Figure 1:
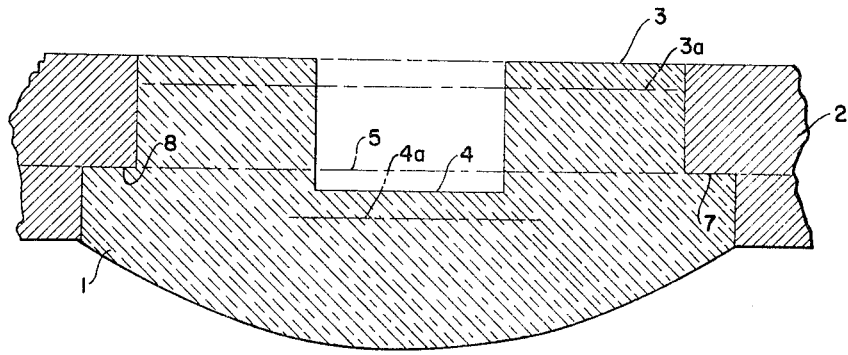
FIGURE 1 shows a cross-section of a focussing device according to this invention.

In the invention as illustrated in FIGURE 1, a transparent viewing device 1 is located in the frame 2 of a camera body. An image from the camera lens may be viewed on the plane ground surface or screen 3, and a similar surface 4, which is spaced from surface 3 in the direction of the observer. These surfaces are perpendicular to the path of the light and the lens of the camera is adjusted until the images on screens 3 and 4 are equally sharp, indicating that the two images are on opposite sides of the true focal plane of the camera lens.

These images when viewed by an observer through the device are seen as displaced from surfaces 3 and 4 an amount dependent on the index of refraction and the thickness of the material through the images are viewed. These images thus will appear to an observer in imaginary planes, as indicated at 3a and 4a. The distances 3–3a and 4–4a will be determined by the refraction of each image in traversing the transparent material. The true positions of the two images represent equal distances on either side of the true focal plane 5, which may then be located between the true positions of the images as corrected for refraction by the material. In FIGURE 1, the shoulder 7 on the focussing device engages a shoulder 8 on the camera body to locate the device with the true focal plane between the image surfaces corresponding to the position of the sensitive layer on which the lens is to be formed.

Figure 2:
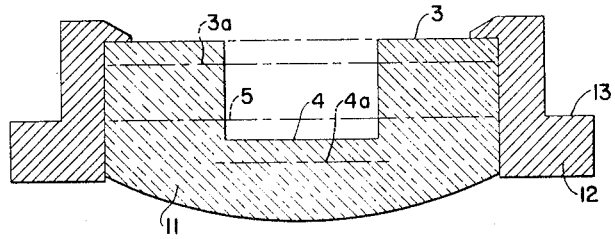
FIGURE 2 shows a cross-section of another form of the invention.

In FIGURE 2, the focussing device 11 has image surfaces 3, 4, similar to the device in FIGURE 1. The device is carried in a frame 12 having a shoulder 13 which serves to locate the device in a camera body in a manner similar to the shoulder on the device in FIGURE 1.

Figure 3:
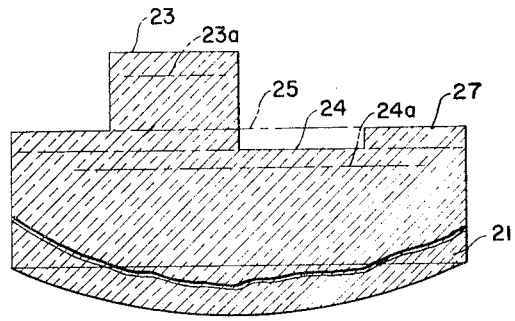
FIGURE 3 shows a cross-section of another type of focussing device which is constructed according to the invention.
Figure 3A:
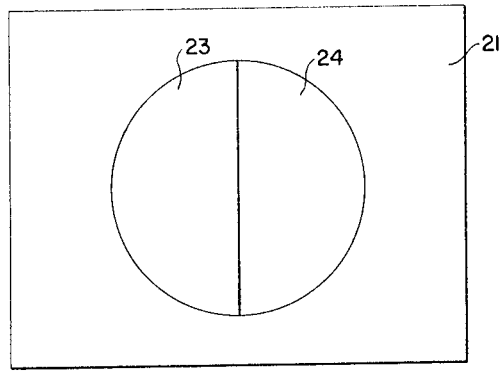
FIGURE 3a shows the device of FIGURE 3 in elevation.

In FIGURES 3 and 3a, the focussing device 21 has a circular central portion with image screens formed on different levels. The images appear to be positioned at 23a, 24a when viewed through the device, and the true focal plane will be located at 25, in a manner similar to the device in FIGURE 1. The surface 27 of the device provides for locating it on a camera body.

Figure 4:
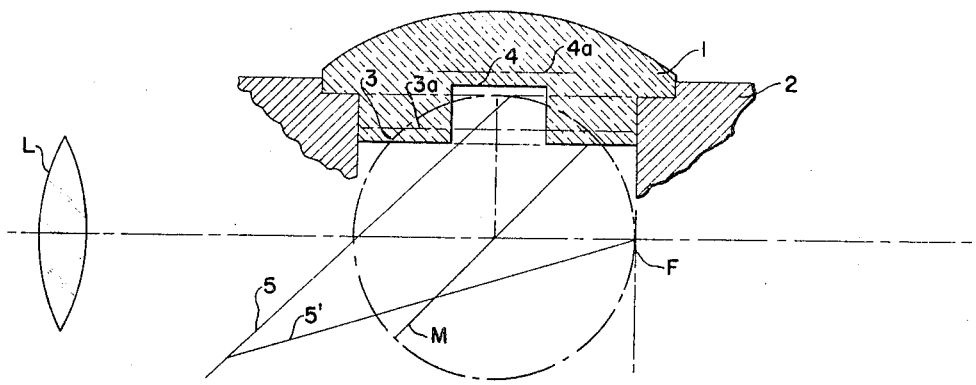
FIGURE 4 shows the form of the invention in FIGURE 1 in position in a reflex camera.

The arrangement of the focussing device in a reflex camera is shown in FIGURE 4. The device 1 is positioned in the camera body 2 and the image from a lens L is reflected by mirror M onto the image surfaces 3 and 4. The true focal plane 5 of the device 1 is positioned the same distance from the lens along the optical path as the sensitive layer F, as shown by the dotted circle. In this manner, when the lens is adjusted to focus the image accurately on the focussing device, the focus on the sensitive layer will be accurate.

It is, of course, to be understood that the present invention is, by no means, limited to the particular arrangement shown in the drawing but also comprises any modifications within the scope of the appended claim.

What I claim is:

In a camera having an adjustable lens for focussing an image on a sensitive layer in the focal plane of the camera, a transparent focusing device, said device having matted plane surfaces spaced longitudinally along and perpendicular to the path of light from said lens on which the image formed by said lens may be focussed, said device having locating means cooperating with positioning means in the camera for locating the device in the camera, said locating means being positioned relative to said matted plane surfaces such that when the image viewed through the device appears equally in focus on said matted surfaces the focal plane of the lens in said device is at the same distance from the lens as the focal plane of the camera, said locating means fixing the focal plane in said device so as to compensate for the longitudinal image displacement caused by the refractive character of said device.

References Cited by the Examiner

UNITED STATES PATENTS

| | | | |
|---|---|---|---|
| 2,286,471 | 6/1942 | Dahl. | |
| 2,341,410 | 2/1944 | Mihalyi | 88—2.6 X |
| 2,350,151 | 5/1944 | Dahl | 88—1 |
| 2,595,495 | 5/1952 | Von Berg et al. | 88—24 |
| 2,969,706 | 1/1961 | Rosier et al. | 88—1 X |

FOREIGN PATENTS

| | | |
|---|---|---|
| 1,200,825 | 7/1959 | France. |
| 547,784 | 9/1956 | Italy. |

JEWELL H. PEDERSEN, *Primary Examiner.*

EMIL G. ANDERSON, *Examiner.*

E. J. CONNORS, T. L. HUDSON, *Assistant Examiners.*